United States Patent
Mata Calvo et al.

(10) Patent No.: US 10,637,576 B2
(45) Date of Patent: Apr. 28, 2020

(54) TRANSMITTER FOR AN OPTICAL FREE-BEAM COMMUNICATION SYSTEM

(71) Applicant: Deutsches Zentrum für Luft- und Raumfahrt e.V., Cologne (DE)

(72) Inventors: Ramon Mata Calvo, Munich (DE); Dirk Giggenbach, Puergen (DE); Christian Fuchs, Munich (DE); Ahmad Mustafa, Seefeld (DE)

(73) Assignee: Deutsches Zentrum für Luft-und Raumfahrt e.V., Cologne (DE)

( * ) Notice: Subject to any disclaimer, the term of this patent is extended or adjusted under 35 U.S.C. 154(b) by 0 days.

(21) Appl. No.: 15/771,655

(22) PCT Filed: Oct. 28, 2016

(86) PCT No.: PCT/EP2016/076135
§ 371 (c)(1),
(2) Date: Apr. 27, 2018

(87) PCT Pub. No.: WO2017/072323
PCT Pub. Date: May 4, 2017

(65) Prior Publication Data
US 2018/0337729 A1    Nov. 22, 2018

(30) Foreign Application Priority Data
Oct. 30, 2015 (DE) .................. 10 2015 221 283

(51) Int. Cl.
*H04B 10/118* (2013.01)
*H04B 10/11* (2013.01)
(Continued)

(52) U.S. Cl.
CPC ....... *H04B 10/118* (2013.01); *H04B 10/5165* (2013.01); *H04B 10/60* (2013.01);
(Continued)

(58) Field of Classification Search
USPC .................................................. 398/118–130
See application file for complete search history.

(56) References Cited

U.S. PATENT DOCUMENTS 5,491,576 A * 2/1996 Bergano ............. H04B 10/2572
398/185
5,870,216 A * 2/1999 Brock ................. H04B 7/18504
398/121
(Continued)

FOREIGN PATENT DOCUMENTS

| | | |
|---|---|---|
| DE | 102014219344 B3 | 2/2016 |
| EP | 0718989 A2 | 6/1996 |
| WO | 02061981 A2 | 8/2002 |

OTHER PUBLICATIONS

Ijaz et al., Study of the Atmospheric Turbulence in Free Space Optical Communications, 2009 (Year: 2009).*
(Continued)

*Primary Examiner* — Jai M Lee
(74) *Attorney, Agent, or Firm* — The Webb Law Firm

(57) ABSTRACT

A transmitter for an optical free-beam communication system includes two light transmitters for the optical transmission of a data signal using one single-sideband modulation, wherein each light transmitter emits a side of the band modulation so that a light signal arriving at a receiver corresponds to a double-sideband modulation.

11 Claims, 4 Drawing Sheets

(51) Int. Cl.
*H04B 10/516* (2013.01)
*H04B 10/60* (2013.01)
*H04B 10/112* (2013.01)

(52) U.S. Cl.
CPC ............ *H04B 10/11* (2013.01); *H04B 10/112* (2013.01); *H04B 10/1121* (2013.01)

(56) References Cited

U.S. PATENT DOCUMENTS

| | | | | |
|---|---|---|---|---|
| 6,243,182 | B1* | 6/2001 | Wang | H04B 10/1121 398/119 |
| 6,959,154 | B1* | 10/2005 | Gnauck | H04B 10/2507 398/159 |
| 7,095,957 | B1* | 8/2006 | Britz | H04B 10/1125 398/70 |
| 7,515,833 | B2* | 4/2009 | Way | G02F 1/0356 359/245 |
| 8,135,287 | B2* | 3/2012 | Yu | H04B 10/5165 398/182 |
| 9,832,055 | B2* | 11/2017 | Kuschnerov | H04B 10/2572 |
| 2001/0021047 | A1* | 9/2001 | Sasai | H04B 10/505 398/79 |
| 2001/0050926 | A1 | 12/2001 | Kumar | |
| 2002/0028043 | A1* | 3/2002 | Medved | H04B 10/11 385/39 |
| 2002/0030877 | A1* | 3/2002 | Way | H04B 10/50 398/185 |
| 2002/0109885 | A1* | 8/2002 | Aburakawa | H04B 10/032 398/121 |
| 2004/0033078 | A1* | 2/2004 | Kube | H04B 10/1121 398/130 |
| 2004/0141752 | A1* | 7/2004 | Shelton | H04B 10/1127 398/120 |
| 2004/0202474 | A1* | 10/2004 | Britz | G02B 6/2938 398/118 |
| 2004/0208644 | A1* | 10/2004 | Sirat | H04B 10/2575 398/186 |
| 2005/0047793 | A1 | 3/2005 | Butler et al. | |
| 2005/0231783 | A1 | 10/2005 | Panzeri | |
| 2006/0245514 | A1 | 11/2006 | Ota et al. | |
| 2008/0002984 | A1 | 1/2008 | Lee et al. | |
| 2009/0009393 | A1* | 1/2009 | Tillotson | G01S 13/955 342/378 |
| 2011/0116805 | A1 | 5/2011 | Xia et al. | |
| 2011/0286749 | A1 | 11/2011 | Schoon | |
| 2012/0008961 | A1 | 1/2012 | Chen et al. | |
| 2012/0321320 | A1* | 12/2012 | Yu | H04B 10/548 398/79 |
| 2013/0064551 | A1* | 3/2013 | Heine | H04B 10/118 398/121 |
| 2013/0101285 | A1* | 4/2013 | Shar | H04B 10/1149 398/38 |
| 2014/0044434 | A1* | 2/2014 | Hashimoto | H04B 10/118 398/125 |
| 2017/0168161 | A1* | 6/2017 | Shapira | G06F 16/3322 |

OTHER PUBLICATIONS

Andrews, L.C., et al., "Laser Beam Propagation through Random Media", 2005 The Society of Photo-Optical Instrumentation Engineers, SPIE Press 2nd. ed.

Bruno, W.M., et al., "Diode laser spatial diversity transmitter", SPIE vol. 1044 Optomechanical Design of Laser Transmitters and Receivers (1989), pp. 187-194.

Calvo, R.M., et al., "Transmitter diversity verification on ARTEMIS geostationary satellite", 2014 Society of Photo-Optical Instrumentation Engineers, SPIE Photonics West 2014.

Chien, H-C, et al., "Optical independent-sideband modulation for bandwidth-economic coherent transmission", 2014 Optical Society of America.

Fiberdyne Labs, Inc. "Dense Wavelength Division Multiplexing (DWDM)", www.fiberdyne.com/products/itu-grid.html.

Graniere, S., et al., "Optical modulation with a single sideband and suppressed carrier", SPIE Applications of Photonic Technology 5, 2002, Quebec City, Canada.

Kudielka, K., et al., "Transparent Optical Intersatellite Link Using Double-Sideband Modulation and Homodyne Reception", AEÜ 56 (2002) No. 4, pp. 254-260.

Lee, U-S. et al., "Optical Single Sideband Signal Generation Using Phase Modulation of Semiconductor Optical Amplifier", IEEE Photonics Technology Letters, vol. 16, No. 5, May 2004.

Sieben, M., et al., "Optical Single Sideband Transmission at 10 Gb/s Using Only Electrical Dispersion Compensation", Journal of Lightwave Technology, vol. 17, No. 10, Oct. 1999.

Violas, M.A., et al., "Optical Single Side Band Modulator based on dual arm MZM and aplications", IEEE Microwave Symposium (MMS) 2009.

* cited by examiner

TRANSMITTER FOR AN OPTICAL FREE-BEAM COMMUNICATION SYSTEM

CROSS-REFERENCE TO RELATED APPLICATIONS

This application is the United States national phase of International Application No. PCT/EP2016/076135 filed Oct. 28, 2016, and claims priority to German Patent Application No. 10 2015 221 283.1 filed Oct. 30, 2015, the disclosures of which are hereby incorporated in their entirety by reference.

Geostationary (GEO) satellites use high data rates in the up-link to transfer the data to be transmitted from the ground gateway to the satellite. From there, they are transmitted to the users on the ground as communication signals via radio transponders. The high-rate capability of these radio links between a ground station and a GEO (so-called GEO-Feeder-Link, GFL) have to become ever higher to meet the demands by the systems. At the same time the available frequency spectrum becomes ever smaller. One solution to this problem is to switch from microwave (radio) connection technology to optical directional radio.

Information about the technologies mentioned can be found in the publications below:

[1] L. C. Andrews and R-Phillips, "Beam Propagation in Turbulent Media", SPIE-Press
[2] Mata-Calvo et al., "Transmitter diversity verification on ARTEMIS geostationary satellite", SPIE-Photonics West 2014
[3] http://www.fiberdyne.com/products/itu-grid.html
[4] Mike Sieben, Jan Conradi and David E. Dodds, "Optical Single Sideband Transmission at 10 Gb/s Using Only Electrical Dispersion Compensation", JOURNAL OF LIGHTWAVE TECHNOLOGY, VOL. 17, NO. 10, OCTOBER 1999
[5] S. Granieri, A. Siahmakoun and D. Thelen, "Optical modulation with a single sideband and carrier suppresses", SPIE, 2003
[6] M. A. Violas and Ruben de Sousa, Optical Single Side Band Modulator based on dual arm MZM and applications, IEEE Microwave Symposium (MMS), 2009
[7] Ui-Soo Lee, Hyun-Do Jung and Sang-Kook Han, "Optical Single Sideband Signal Generation Using Phase Modulation of Semiconductor Optical Amplifier", IEEE PHOTONICS TECHNOLOGY LETTERS, VOL. 16, NO. 5, May 2004

In the domain of optics no regulatory spectrum limitations exist. In addition, optical data links—as known from terrestrial fiber optic technology—allow for significantly higher data rates (currently up to 100 Gbps per channel, which could be increased about one hundredfold, if wavelength division multiplex technology—DWDM—is used) [cf. publication 3].

However, optical GFLs (OGFL) are disturbed by the atmosphere: clouds above the optical ground station (OGS) block the link to the satellite. This can be encountered to a sufficient extent by OGS diversity.

Another atmospheric influence is the refractive index turbulence (RIT) which causes an interference with the optical wavefront and thus causes intensity variations (scintillations) in the further course of propagation [cf. publication 1]. Depending on the position of the OGS and the time of day, the wavelength used and the elevation of the link (angle between the satellite, the ground station and the horizon), the RIT may cause significant field perturbations so that the fluctuation of the signal at the GEO is extremely strong. Depending on the transmission method and the RIT situation, the signal reception is strongly disturbed or even prevented thereby. The fluctuations have been established and quantified for a concrete scenario, e.g. in publication [2]. The fluctuations in received power are caused by the variations in intensity distribution at the satellite.

The temporal behavior of these signal fluctuations is a function of the temporal change of the refraction index structure. The latter is influenced primarily by wind from the side. This means that typically fade periods of 2 to 20 ms have to be expected. Such fading events are usually compensated by FEC (Forward Error Correction) algorithms and by ARQ (Automated Repeat Request) protocols, whereby, however, basic delays on the order of a multiple of the fading period (in this case about 100 ms) are caused and additional throughput losses (caused by the FEC overhead) have to be accepted.

An approach to a reduction of these fluctuations is the transmitter diversity (Tx-Div): here, the OGS emits two or more ($n_{Tx}$) parallel transmitter beams "Tx" to the GEO. These beams propagate through various IRT volumes (for this purpose the IRT structures have to be significantly smaller than the Tx distance, which is very well guaranteed with typical structure sizes in the cm or dm range for Tx distances of about 1 m and upwards). At the satellite, they thus generate a plurality of statistically independent intensity patterns. If the wavelengths used with the different transmitters are different (the frequency difference has to be greater than the band width of the data receiver), the patterns are overlapped incoherently, i.e. the intensities add up. Often, this is generally the case with simple intensity modulations/direct reception systems (IM/DD). This results in a balance of minima and maxima, i.e. the relative fluctuations are reduced. Specifically, the scintillation index SI changes to $SI(n)=SI(1)/n_{Tx}$.

Transmitter diversity for IM/DD is illustrated in FIG. 1. Here, two transmitters are positioned at a distance $d_{Tx}$ from each other and radiate towards the same target. The structure size of the turbulence cells is smaller than $d_{Tx}$. This results in different intensity patterns which add up coherently if the frequencies of the two transmitters are far apart from each other.

Using this relatively simple technique of incoherent Tx diversity, it is possible to reduce the received power fluctuations. In particular, the reduction of the minima (i.e. avoiding strong fades) has a very advantageous effect. The received signal is stabilized thereby. The technique is already used in experimental optical satellite uplinks, e.g. in SILEX (uplink from ESA OGS on Tenerife to GEO Artemis of ESA—with up to four parallel transmission beams, and in the experiment KIODO and KODEN in uplinks to the Japanese satellite OICETS/Kirai of JAXA).

FIG. 2 illustrates an example for a received power vector of 0.5 seconds in length measured at the satellite. Here, an uplink of an optical ground station to a receiver on a geostationary satellite is evaluated once with and once without transmitter diversity (measured in the project ArtemEx). The solid line represents a signal generated by one transmitter, while the dashed line represents a signal generated by two transmitters. The latter has weaker fades and surges and is therefore better suited for data transmission.

When Tx-Div is used with an incoherent, but very broadband transmission using IM/DD, e.g. a 40 Gbps IM/DD data channel is emitted via two (or n) physically separate DWDM channels (or in one 100 GHz DWDM channel), and it has to be ensured that the spectrums of the two diversity channels belonging to one data channel do not overlap (this is also the case with all low-rate transmissions, where, however, the spectral bandwidth efficiency is irrelevant). Should the optical spectrums overlap, perturbations of the signal quality will result (crosstalk by mixing the overlapping spectral portions with beat-like effects in the partial region—see FIG. 3 right side—the received signal is thereby deteriorated or even useless, depending on the degree of overlap). In a multi-channel (DWDM) transmission, the Tx-Div thus compels the required optical bandwidth to be a multiple of the data rate (to avoid overlap). This may have the effect that the available spectrum in total is not sufficient to transmit the required data rates. For example, a 40 Gbps data signal requires two 100 GHz physical DWDM channels, i.e. 200 GHz of physical bandwidth per 40 Gbps of effective user data rate, which limits the overall rate to 640 Gbps given the typically technically available 32 DWDM channels. Using optimized filters and demultiplexers, the channels could possibly be closer to each other, yet the basic limitation that with Tx-Div a multiple of the bit rate is required, remains.

It is an object of the invention to provide a transmitter for an optical free-beam communication system, which has an improved spectral efficiency.

In some non-limiting embodiments or aspects, a transmitter for an optical free-beam communication system can be used in particular for a data uplink to a satellite and serves to emit a light signal. The transmitter comprises two light transmitters for the optical transmission of the data signal using a single-sideband modulation, wherein each light transmitter emits one side of the band modulation so that the signal arriving at the receiver corresponds to a double-sideband modulation.

Single-sideband modulation is used in radio communication and optical communication and has an improved spectrum efficiency and energy efficiency. In optical data transmission methods single-sideband modulation is used to minimize interferences generated by chromatic dispersion and non-linear effects of the optical communication phases (cf. publication [4]). Single-sideband modulation can be generated by Hilbert-transformed data with a dual driver, by a single Mach-Zehnder modulator (cf. publication [4]), by two Mach-Zehnder modulators (cf. publication [5]) or by a phase modulation of an optical semiconductor amplifier (cf. publication [7]). A coherent receiver is usually used, when the optical carrier is suppressed (cf. publication [4]).

In some non-limiting embodiments or aspects, double transmitter diversity is combined with single-sideband modulation. Each transmitter emits one side of the band modulation so that the receiver receives a double-sideband modulation, namely each sideband from a respective transmitter. Thus, the transmitter has the same bandwidth as with a double-sideband modulation, which allows for an efficient utilization of the transmitter diversity also for maximum-rate DWDM transmission with IM/DD. Thus, the use of DWDM transmission in the domain of optical Geo Feeder links becomes significantly more efficient. No optical bandwidth is used up by transmitter diversity anymore. A long-term objective of a transmission capacity of a multi-terabit/s becomes possible.

At the transmitter side, the single-sideband modulation is generated. A single-sideband modulation creates greater technical effort. The receiver receives the signal as a double-sideband modulation.

The transmitter diversity may be formed by two transmitters arranged at a defined distance from each other. This distance between the two transmitters may be greater than the structure sizes of the turbulence cells of the optical free-space transmission, so that different intensity patterns result at the transmitter, which patterns act incoherently. For example, the two transmitters can be arranged half a meter from each other, so that the signal is transmitted via different atmospheric paths. The two signals are combined at the receiver, so that the scintillation is halved.

It is preferred that the receiver terminal is exclusively configured for demodulating a double-sideband modulation signal.

Besides a reduction of the fluctuations, the transmitter diversity additionally allows for an increase of the overall emitted power. The same may be limited per transmitter telescope, e.g. for technical reasons (e.g. because of the thermal capacity of the transmission fiber or other components, or because of the eye safety of the transmission system). By distributing the power to a plurality of transmitters, these technical limitations can be encountered efficiently.

In some non-limiting embodiments or aspects, the transmitter can in particular be used for a data uplink to a satellite from a ground station. Here, the satellite may be a LEO or a GEO satellite.

Further, in some non-limiting embodiments or aspects, the transmitter can be used in an optical link to an aircraft/OAVs/HAPs from an optical ground station and/or a ground-to-ground communication. Such communication could be used e.g. to link building LAN to the Internet or to link mobile communication base stations. Far-reaching FSO links (up to 20 km) may also be used as communication backbones, in particular if a fading problem can be remedied.

In addition, an application in optical inter-HAP links can be used. These stratospheric communication platforms are advantageously connected via optical directional radio, wherein the distance of up to several 100 km entails a propagation time that has adverse effects in case of several repetition requests (ARQ).

In some non-limiting embodiments or aspects, the transmitter may be used for the optical transmission of frequency standards for the synchronization of optical clocks.

BRIEF DESCRIPTION OF THE DRAWINGS

Non-limiting embodiments or aspects of the invention will be explained below with reference to Figures.

In the Figures:

FIG. 3 shows interference effects by overlap of the signal spectrums in the frequency range. On the left-hand side, a slight overlap of two signal spectrums is illustrated. On the right-hand side, a simulated effect in the time domain is illustrated for a large overlap. It is discernible that beat effects reduce the "eye opening" of the digital signal stream.

FIG. 4 is a block diagram of a non-limiting embodiment or aspect of the transmitter (top) and the receiver (bottom). SSB signals are generated for each aperture. Channel A and channel B lead to different channels. The receiver receives the overlap of the two signals and thus only has to demodulate a double-sideband modulation. The transmitter diversity has the same bandwidth as a double-sideband modulation.

FIGS. 5 and 6 illustrate two simulations using the transmitter. The scintillation parameter "scint" represents the standardized variance of the received power. The two graphs in the upper portion of the Figure illustrate the measured power vectors in a GEO uplink laser transmission (see publication [2]). The measured signal is shown on the left and the probability density function is shown on the right. In the bottom portion of FIG. 5, the transmitter diversity method is simulated by overlapping the measured signal with a time-shifted version of itself, so that each channel receives a non-correlated version. The modulated data are included in the real portion of the received signal.

FIG. 5 illustrates a strong refraction index turbulence, wherein the measured uplink signal in a GEO satellite with the use of a transmitter is illustrated top left, while the probability density function of the measured power is illustrated top right in this scenario. The probability density function of a simulated SSB double transmitter diversity calculated from the measured signal is illustrated bottom left. The simulated signal with SSB transmitter diversity calculated from the measured signal is illustrated bottom right.

FIG. 6 corresponds to FIG. 5, wherein a weak refraction index turbulence is illustrated.

Figure 1:
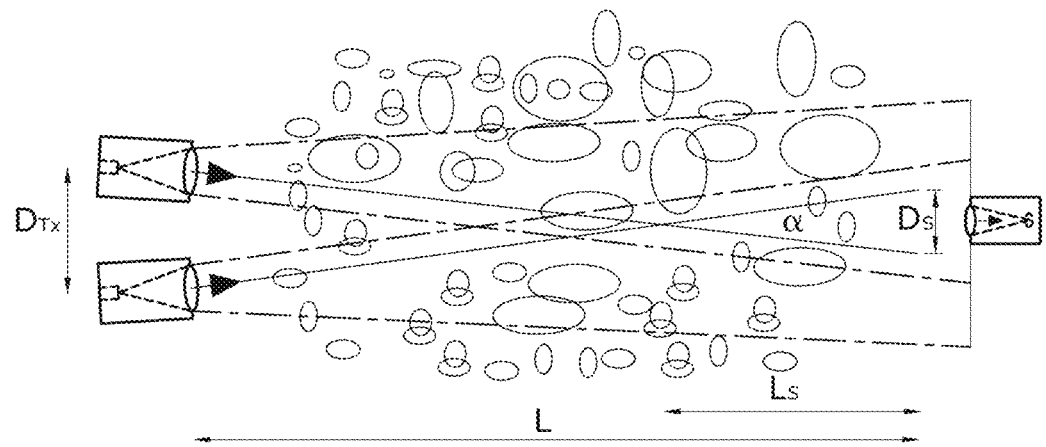
FIG. 1 illustrates a functionality of a transmitter diversity.
Figure 2:
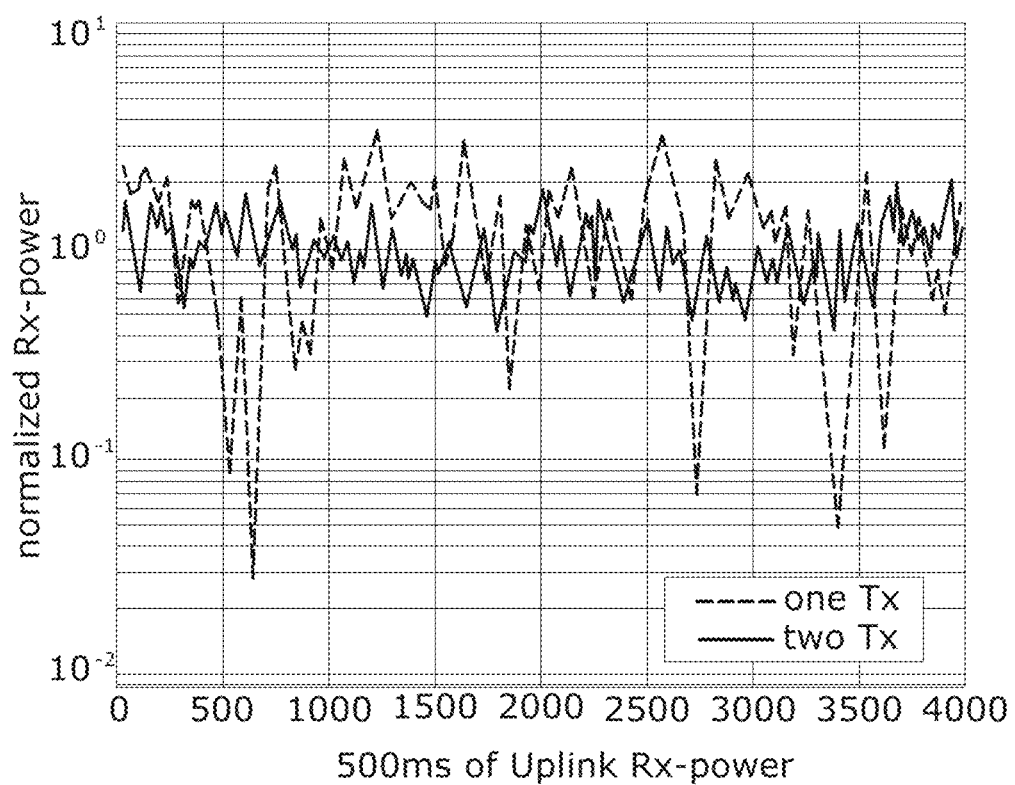
FIG. 2 shows an exemplary received power vector received at a satellite.
Figure 3A:
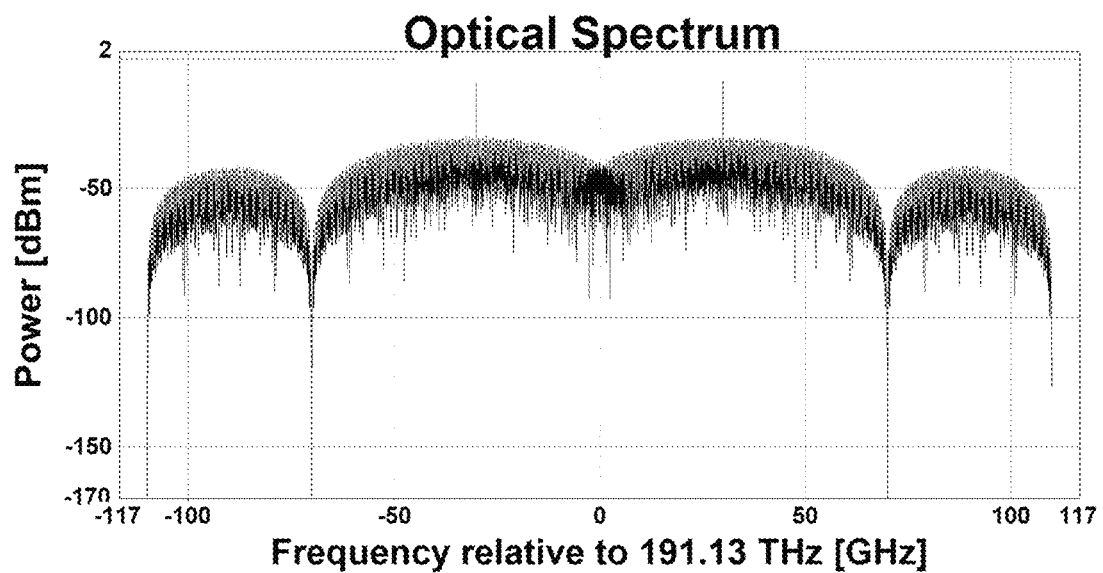
FIGS. 3a and 3b show interference effects by overlap of signal spectrums in the frequency range.
Figure 3B:
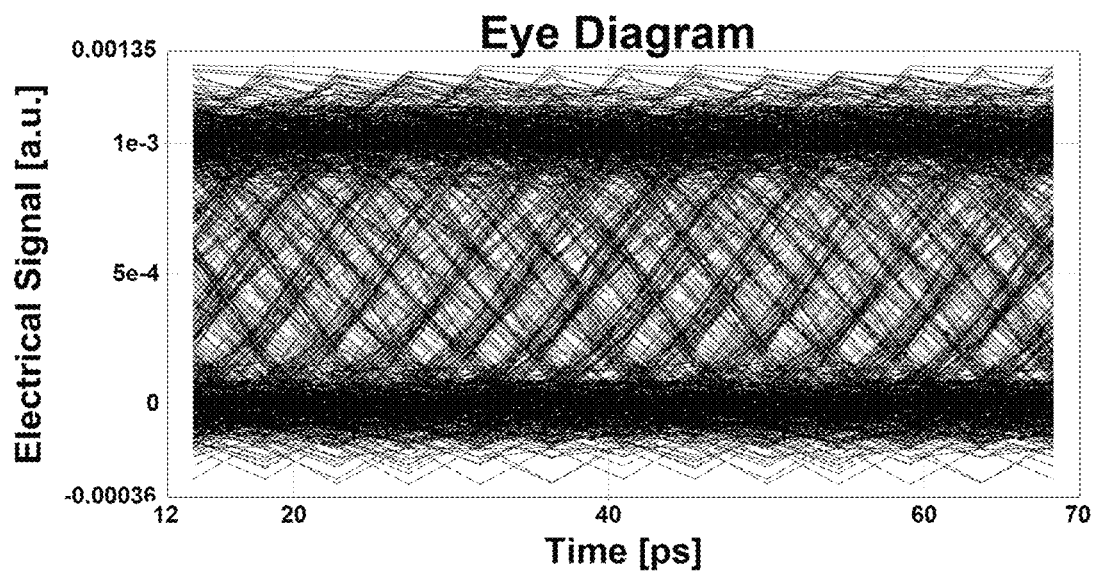
Figure 4:
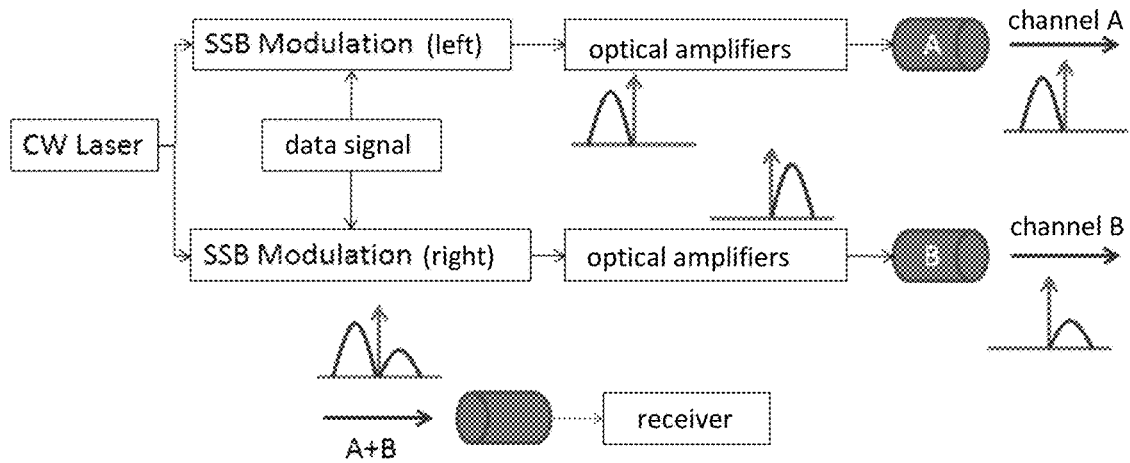
FIG. 4 shows a schematic of a transmitter.
Figure 5:
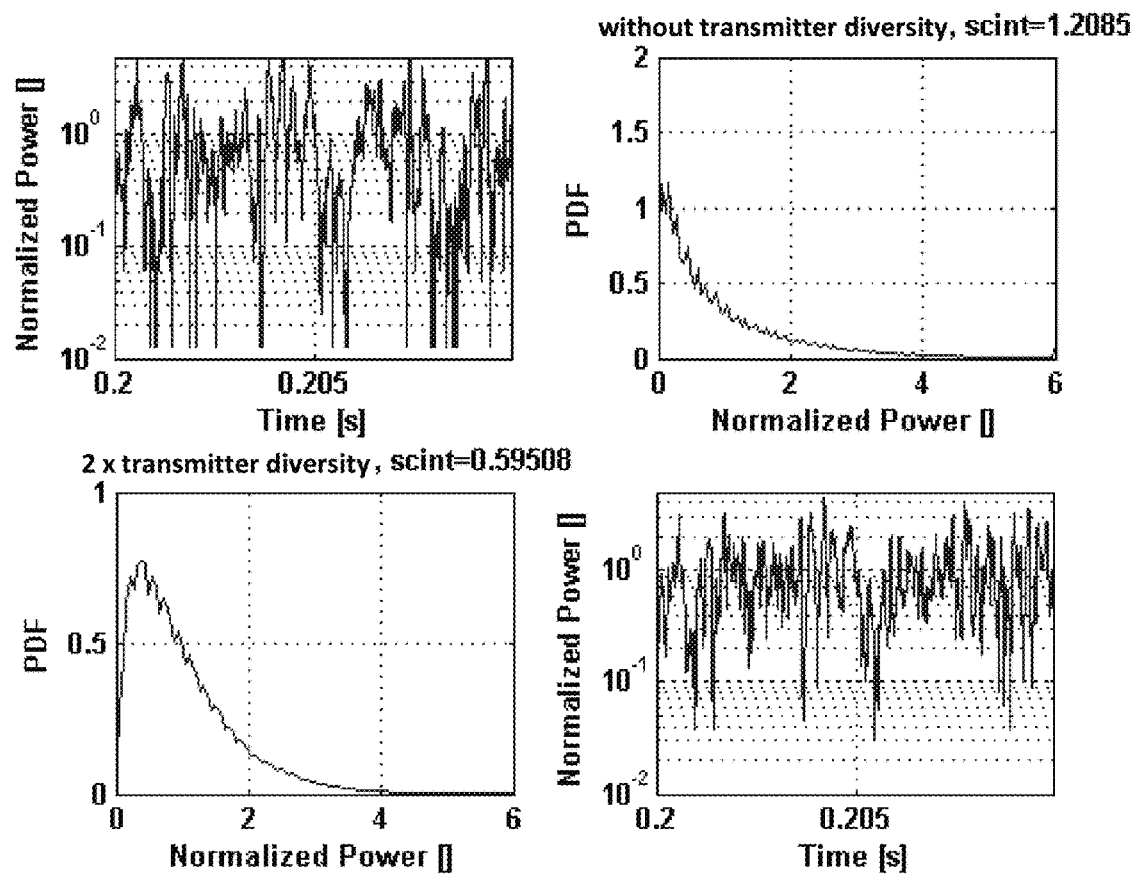
FIGS. 5 and 6 illustrate refraction index turbulences of the transmitter.
Figure 6:
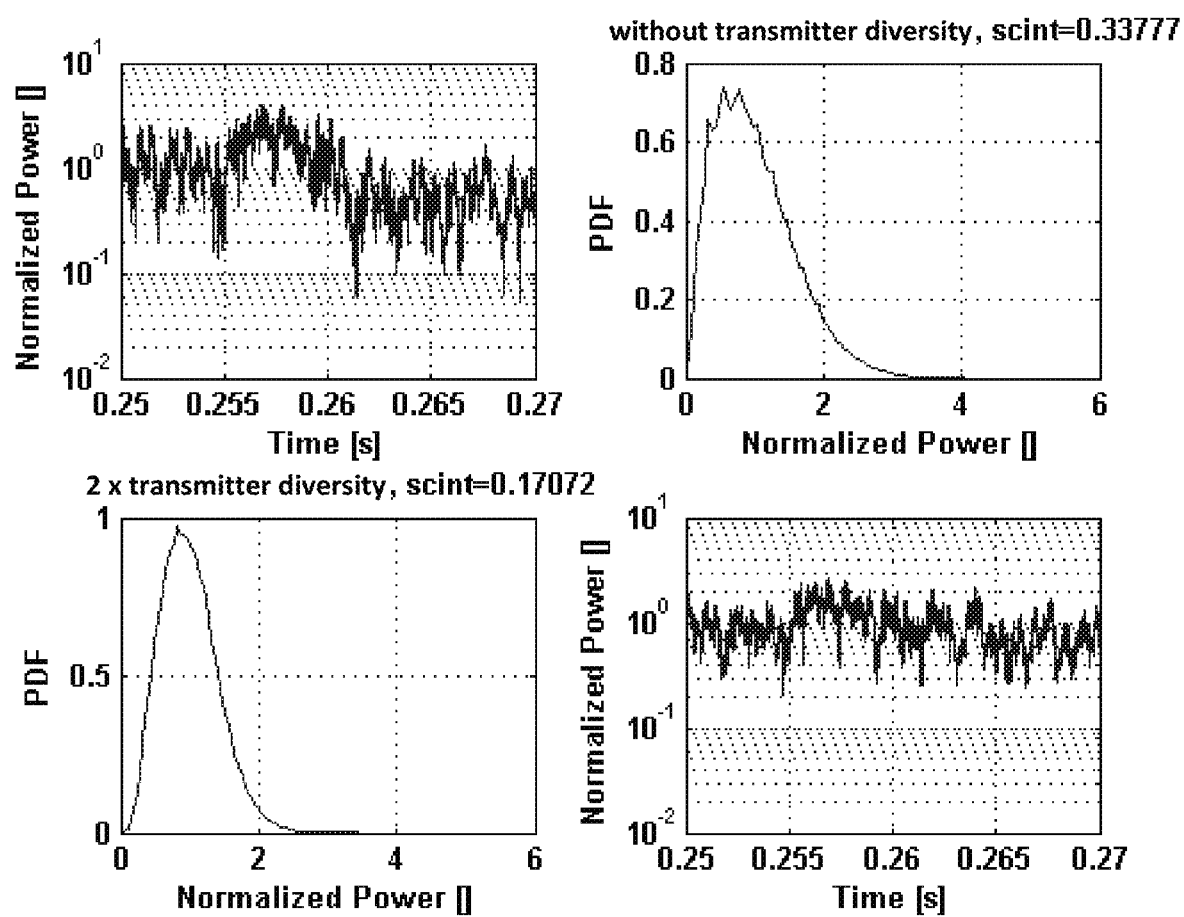

Due to the relation $SI(n)=SI(1)/n_{Tx}$ it is expected that the scintillation will halve when two transmitters are used. The result of the simulation illustrated in FIG. 5 and FIG. 6 meets this expectation.

The invention claimed is:

1. A transmitter for an optical free-beam communication system comprising:
   a first light transmitter configured to transmit a first light signal, wherein the first light signal is based on a data signal that is modulated using a first single-sideband modulation; and
   a second light transmitter configured to transmit a second light signal, wherein the second light signal is based on the data signal that is modulated using a second single-sideband modulation, wherein the second light signal is based on the same data signal that is modulated using the first single-sideband modulation to produce the first light signal,
   wherein the first light signal and the second light signal are transmitted via different atmospheric paths, and
   wherein the first single-sideband modulation corresponds to a first side of a band modulation and the second single-sideband modulation corresponds to a second side of the band modulation so that a third light signal arriving at a receiver corresponds to a double-sideband modulation, wherein the first side of the band modulation and the second side of the band modulation correspond to each side of the double-sideband modulation, wherein the third light signal comprises a combination of the first light signal and the second light signal.

2. The transmitter of claim 1, wherein the first light transmitter and the second light transmitter are spaced apart by a distance of 0.5 meters.

3. A receiver terminal exclusively for demodulation of a double-sideband modulation signal,
   wherein the receiver terminal is configured to:
      receive a first light signal transmitted by a first light transmitter, wherein the first light signal is based on a data signal that is modulated using a first single-sideband modulation;
      receive a second light signal transmitted by a second light transmitter, wherein the second light signal is based on the data signal that is modulated using a second single-sideband modulation, wherein the second light signal is based on the same data signal that is modulated using the first single-sideband modulation to produce the first light signal,
      wherein the first light signal and the second light signal are received via different atmospheric paths, and
      wherein the first light signal and the second light signal combine to form a third light signal that comprises the double-sideband modulation signal, wherein the first single-sideband modulation corresponds to a first side of a band modulation and the second single-sideband modulation corresponds to a second side of the band modulation so that the third light signal arriving at the receiver terminal corresponds to a double-sideband modulation, wherein the first side of the band modulation and the second side of the band modulation correspond to each side of the double-sideband modulation;
      demodulate the double-sideband modulation signal to produce the data signal.

4. An optical free-beam communication system, comprising:
   the transmitter of claim 1; and
   the receiver terminal of claim 3.

5. The transmitter of claim 1, wherein the first light signal and the second light signal in combination have a same bandwidth as the data signal modulated using a double-sideband modulation.

6. The transmitter of claim 1, wherein the first light transmitter is configured to transmit the first light signal on a first channel and the second light transmitter is configured to transmit the second light signal on a second channel.

7. The transmitter of claim 6, wherein the first channel or the second channel is a wavelength division multiplex technology (DWDM) channel.

8. The receiver terminal of claim 3, wherein the receiver terminal is configured to receive an overlap of the first light signal and the second light signal as the third light signal.

9. The receiver terminal of claim 3, wherein the receiver terminal is configured to receive the first light signal and the second light signal on a single channel.

10. The receiver terminal of claim 3, wherein the receiver terminal is a component of a geostationary satellite.

11. An optical free-beam communication system, comprising:
   a first light transmitter configured to transmit a first light signal, wherein the first light signal is based on a data signal that is modulated using a first single-sideband modulation;
   a second light transmitter configured to transmit a second light signal, wherein the second light signal is based on the data signal that is modulated using a second single-sideband modulation, wherein the second light signal is based on the same data signal that is modulated using the first single-sideband modulation to produce the first light signal,
   wherein the first light signal and the second light signal are transmitted via different atmospheric paths, and
   wherein the first single-sideband modulation corresponds to a first side of a band modulation and the second single-sideband modulation corresponds to a second side of the band modulation so that a third light signal arriving at a receiver corresponds to a double-sideband modulation, wherein the first side of the band modulation and the second side of the band modulation correspond to each side of the double-sideband modulation, wherein the third light signal comprises a combination of the first light signal and the second light signal; and a receiver terminal configured to:
  receive an overlap of the first light signal and the second light signal, wherein the overlap of the first light signal and the second light signal comprises a double-sideband modulation signal; and
demodulate the double-sideband modulation signal.

\* \* \* \* \*

UNITED STATES PATENT AND TRADEMARK OFFICE
CERTIFICATE OF CORRECTION

PATENT NO. : 10,637,576 B2  
APPLICATION NO. : 15/771655  
DATED : April 28, 2020  
INVENTOR(S) : Ramon Mata Calvo et al.

Page 1 of 1

It is certified that error appears in the above-identified patent and that said Letters Patent is hereby corrected as shown below:

On the Title Page

Column 1, Item (72) Inventors, Line 4, delete "Seefeld" and insert -- Gilching --

Column 1, Item (73) Assignee, Line 1, delete "Lund-und" and insert -- Luft- und --

Signed and Sealed this  
Twenty-first Day of July, 2020

Andrei Iancu  
*Director of the United States Patent and Trademark Office*